(12) United States Patent
MacCárthaigh et al.

(10) Patent No.: US 10,318,747 B1
(45) Date of Patent: Jun. 11, 2019

(54) BLOCK CHAIN BASED AUTHENTICATION

(71) Applicant: AMAZON TECHNOLOGIES, INC., Seattle, WA (US)

(72) Inventors: Colm Gearóid MacCárthaigh, Seattle, WA (US); Eric Jason Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 153 days.

(21) Appl. No.: 14/984,069

(22) Filed: Dec. 30, 2015

(51) Int. Cl.
*G06F 21/62* (2013.01)
*H04L 29/06* (2006.01)

(52) U.S. Cl.
CPC ...... *G06F 21/6218* (2013.01); *H04L 63/0428* (2013.01); *H04L 63/10* (2013.01)

(58) Field of Classification Search
CPC .................................................. G06F 21/6218
See application file for complete search history.

(56) References Cited

U.S. PATENT DOCUMENTS

| | | | | | |
|---|---|---|---|---|---|
| 5,764,974 | A * | 6/1998 | Walster | ............... | G06F 3/04895 706/18 |
| 5,794,239 | A * | 8/1998 | Walster | ............. | G06F 16/90344 |
| 5,812,877 | A * | 9/1998 | Young | ................... | G06F 13/126 710/21 |
| 8,533,010 | B2 * | 9/2013 | Daouk | ................... | G06Q 10/10 705/1.1 |
| 9,515,999 | B2 * | 12/2016 | Ylonen | ................. | H04L 63/062 |
| 2003/0187653 | A1 * | 10/2003 | Okubo | ................... | B25J 13/003 704/270 |
| 2015/0222604 | A1 * | 8/2015 | Ylonen | ................. | H04L 63/062 713/171 |
| 2015/0379510 | A1 * | 12/2015 | Smith | ................ | G06Q 20/3829 705/71 |
| 2016/0027229 | A1 * | 1/2016 | Spanos | .................. | G07C 13/00 705/51 |
| 2016/0164884 | A1 * | 6/2016 | Sriram | ............ | G06Q 10/06315 705/51 |

(Continued)

OTHER PUBLICATIONS

Alqassem et al.; Towards Reference Architecture for Cryptocurrencies: Bitcoin Architectural Analysis; 2014 IEEE International Conference on Internet of Things (iThings), and IEEE Green Computing and Communications (GreenCom) and IEEE Cyber, Physical and Social Computing (CPSCom); IEEE Xplore (Year: 2014).*

(Continued)

*Primary Examiner* — Bradley W Holder
(74) *Attorney, Agent, or Firm* — Blank Rome LLP

(57) ABSTRACT

A computing system includes a programming interface of a control interface of a distributed computing environment, a service layer of the control interface, and a manager of the control interface. The programming interface is configured to receive a block of a block chain database. The block includes a ledger that includes a plurality of transactional data records. The service layer is configured to analyze the plurality of records to determine that one of the plurality of records is an indication of a request by a client for a service provided by a data interface of the distributed computing environment. The manager is configured to allocate access to execute the request in response to receiving the indication of the request.

24 Claims, 12 Drawing Sheets

(56) References Cited

U.S. PATENT DOCUMENTS

| | | | |
|---|---|---|---|
| 2016/0259937 A1* | 9/2016 | Ford | G06F 21/554 |
| 2017/0017936 A1* | 1/2017 | Bisikalo | G06Q 20/065 |
| 2017/0017954 A1* | 1/2017 | McDonough | G06Q 20/36 |
| 2017/0017955 A1* | 1/2017 | Stern | G06Q 20/36 |
| 2017/0046664 A1* | 2/2017 | Haldenby | G06Q 20/0655 |
| 2017/0132625 A1* | 5/2017 | Kennedy | G06Q 20/065 |
| 2017/0140375 A1* | 5/2017 | Kunstel | G06Q 20/40 |
| 2017/0140408 A1* | 5/2017 | Wuehler | G06Q 30/0207 |
| 2017/0154331 A1* | 6/2017 | Voorhees | G06Q 20/3829 |
| 2017/0177898 A1* | 6/2017 | Dillenberger | G06F 16/2379 |
| 2017/0180469 A1* | 6/2017 | Ford | H04L 67/1008 |
| 2017/0206522 A1* | 7/2017 | Schiatti | G06Q 30/00 |

OTHER PUBLICATIONS

Wang et al.; Static application security testing for crypto-currency ecosystems; Proceeding CASCON '14 Proceedings of 24th Annual International Conference on Computer Science and Software Engineering; pp. 339-342; ACM Digital Library (Year: 2014).*

* cited by examiner

| Resource | Requires Data Block Chain Audit Trail |
|---|---|
| Resource 126A | Yes |
| . . . | . . . |
| Resource 126N | No |

Audit Level Policy 602

BLOCK CHAIN BASED AUTHENTICATION

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties.

In many of these distributed computing networks, clients have the ability to request services provided by the distributed computing network. For example, a client may be able to request access to specific compute instances and/or storage instances. Thus, the distributed network receives the service request from the client. This request then may be transmitted (pushed or pulled) to networking devices which may execute the request and provide the requested service to the client.

BRIEF DESCRIPTION OF THE DRAWINGS

For a detailed description of various examples, reference will now be made to the accompanying drawings in which.

DETAILED DESCRIPTION

Figure 1:
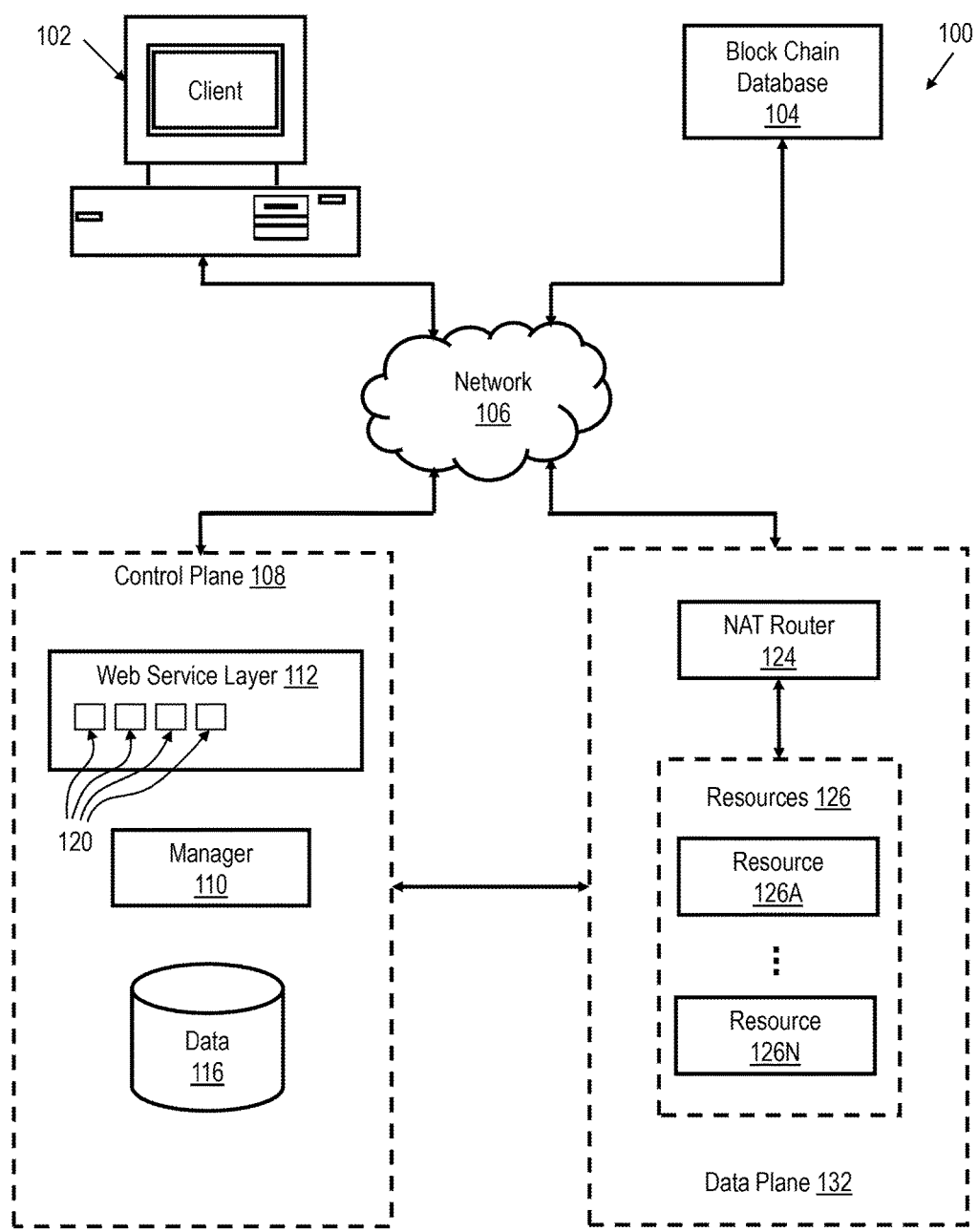
FIG. 1 shows a block diagram of an environment for executing service requests in a distributed computing environment, in accordance with various embodiments.

Techniques, including systems and methods, of the present disclosure provide tools for executing service requests in a distributed computing environment. In an embodiment, a service request is generated by a client. For example, a client may submit a request to launch a compute instance, attach a storage volume to an instance, store data in a data storage service, etc. of the distributed computing environment. The service request and/or an indication that a service request has been made may be transmitted to a plurality of computing systems which are part of a network which maintains and builds upon a block chain database. Thus, each of the computing systems maintains a version (i.e., a copy) of the block chain database. At the same time as the computing systems receive the service request, the computing systems of this block chain network also may attempt to "mine" or unlock a new (or additional) block in the block chain database. The computing system that successfully mines the new block attaches a list of transaction records, including the service request, that the computing system received while mining the new block and propagates the new block to the nodes of the block chain network. Included in the network that maintains and builds upon the block chain database is a control plane of the distributed computing environment (or alternatively just has access to the block chain database). Therefore, the control plane receives the new block that includes a transaction record that contains the service request. After authenticating the service request stored as a transaction record in the block chain database, the control plane may execute the service request and may submit a responsorial record to the plurality of computing systems of the block chain network to be included in the block chain database. The responsorial record indicates the actions taken by the distributed computing network in response to the service request. The computing system that mines the next block in the block chain database after the responsorial record is submitted then may include the responsorial record in the list of transaction records attached to the next block. The next block then may be propagated to the nodes of the block chain network which may include the client. In this way, a client's service request for a service provided by a distributed computing environment and actions taken by the control plane of the distributed computing environment may be stored in the block chain database. Because information stored in a block chain database is exceptionally difficult to alter once committed to the block chain, the systems and methods described herein provide a robust audit trail of client service requests.

In much of the following description, a provider network is used as an example of a distributed system in which the centralized networking configuration techniques may be implemented. Virtual networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the validation techniques described herein may be implemented, those techniques may also be applied to other types of distributed systems than provider networks, e.g., to large-scale distributed application environments in which different components of the applications may have time-varying bandwidth needs.

FIG. 1 shows a block diagram of an environment 100 for executing service requests in a distributed computing environment, in accordance with various embodiments. Systems and methods in accordance with one embodiment provide at least one resource access gateway, or control plane, either as part of the data environment or in a path between the user and the data plane, in some embodiments via a distribution plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a provider network without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 108 can be used in some environments to provide and/or manage access to various resources 126 in the data plane 132. In a distributed computing environment, this can correspond to a manager 110 or similar system that manages access to the various resources in the provider network. In one embodiment, a set of application programming interfaces (APIs) 120 or other such interfaces are provided that allow a user or customer to make requests for services provided by the distributed computing environment by resources 126. Once access is established, a resource is allocated, etc., a user can communicate directly with the resource to perform certain tasks relating to that resource, such as data storage or processing. The user, in some embodiments, can use direct interfaces or APIs to communicate with data instances, hosts, or other resources once access is established, but uses the control plane component(s) to obtain the access.

In this example, a computing device, client 102, for an end user is shown to be able to make calls through a network 106 to a control plane 108 (or other such access layer) for various services provided by the resources 126. For example, the client 102 may make a call to control plane 108 to perform a task such as to launch a virtual machine, store data in a resource, retrieve data stored in a resource, configure access permissions for users, request a specific network configuration, etc. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data, control, and distribution "plane," it should be understood that this can refer to an actual or virtual separation of at least some resources (e.g., hardware and/or software) used to provide the respective functionality. Further, the control plane 108 can be considered to be part of the data plane 132 and/or distribution plane in certain embodiments. While a single control plane is shown in this embodiment, there can be multiple instances of control or access management components or services in other embodiments. A control plane can include any appropriate combination of hardware and/or software, such as at least one server configured with computer-executable instructions.

In some embodiments, calls made by client 102 may take the form of a service request and may be posted as a transaction record in block chain database 104. Block chain database 104 may be any type of block chain database. For example, block chain database 104 may be a distributed database that maintains a list of transaction records that may include records for any type of transaction. For instance, the transaction records that are maintained in the block chain database 104 may include transactions for cryptocurrencies (e.g., bitcoins) and/or any other record. Block chain database 104 may be distributed to, and stored in, many nodes (e.g., hundreds, thousands, millions, etc.) including third party nodes that are not associated with client 102 and/or control plane 108. Thus, the transaction records stored in block chain database 104 are public. Therefore, a service request posted by client 102 as a transaction record in block chain database 104 is public.

The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request for a specific network mapping as part of a network configuration option, a request to store data in a storage instance, a request to retrieve data stored in a storage instance, and/or a request to launch or terminate a specific instance. In other words, APIs 120 may receive commands from client 102 to provide a service (e.g., launch a virtual machine, store data, retrieve data, etc.). In some embodiments, the APIs 120 may receive transaction records stored in block chain database 104 including any service request posted by client 102 in block chain database 104.

Web service layer 112, in one embodiment, includes a scalable set of customer-facing and/or other third party facing servers that can provide the various control plane APIs 120 and return the appropriate responses based on the API specifications. The Web service layer 112 also can include at least one API service layer that in one embodiment consists of stateless, replicated servers which process the externally-facing customer APIs 120. The Web service layer 112 can be responsible for Web service front end features such as authenticating customers based on credentials, authorizing the customer, throttling customer requests to the API servers, validating user input, and marshalling or unmarshalling requests and responses. In this example, the Web services layer 112 can analyze the transaction records received from the block chain database 104 to determine whether any of the received transaction records stored in the block chain database 104 is a service request. For example, the Web service layer 112 can include a program that reads the transaction records and parses them to identify whether they conform to a format of a service request. If the Web services layer 112 makes a determination that one or more of the transaction records is a service request, the Web services layer 112 may further parse the request to determine the type of request, the appropriate type(s) of resource needed, or other such aspects. For example, the Web service layer 112 can include a program that reads the transaction records and parses them to identify whether they conform to a format of a service request. In many embodiments, the Web services layer 112 and/or API service layer will be the only externally visible component, or the only component that is visible to, and accessible by, third parties, such as customers of the control service and/or third parties that store block chain database 104. The servers of the Web services layer 112 can be stateless and scaled horizontally. API servers, as well as the persistent data store 116, can be spread across multiple data centers in a geographical region, or near a geographical location, for example, such that the servers are resilient to single data center failures.

The control plane can include one or more resource allocation managers 110, each responsible for tasks such as validating the user or client associated with the service request and obtaining or allocating access to the appropriate resource(s) in order to execute the request. In some embodiments, the managers 110 may authenticate the service request by, in some examples, authenticating a digital signature attached to the request. Such a system can handle various types of requests and establish various types of connections. Such a system also can handle requests for various types of resources, such as specific graphic processors or other types of hardware or hardware functionality, and can provide access to the appropriate resource(s). Components of the data plane 132, or the resource layer of the service provider environment, may perform the necessary tasks to allocate virtual machine instances residing on the data plane 132 in response to customer requests. For allocation of an instance, for example, the manager 110 can be configured to provision an instance (e.g., a virtual machine) by selecting a host to run the instance, sending a command to a server manager (e.g., virtualization system such as a hypervisor), to launch the instance, and any other set-up operations, such as allocating a volume of off-instance persistent storage, attaching the persistent storage volume to the instance, and allocating and attaching a public IP address, network interface, or other address, port, interface, or identifier for the instance. For tasks such as obtaining processing of an instruction using a particular type of hardware, for example, the components of the data plane 132, in conjunction with the control plane 108, can perform actions such as provisioning a device for a user and providing shared and/or dedicated access to the resource for a period of time at a particular level of access to the resource. Whenever a user requests implementation of a network configuration, data store 116 stores specific state information for each of the devices needed to implement the requested network configuration. It should be understood that the data store 116 can be a separate data store or a portion of another data store.

In various embodiments, as discussed, the data plane 132 takes the form of (or at least includes or is part of) a service provider environment, or a set of Web services and resources that provides data storage and access across a network of hardware and/or software components. A service request received from a client 102 directly from the client 102 via network 106 or by submitting the request to block chain database 104, for example, can be directed to and distributed to any of resources 126, including resources 126A-126N, to execute the request. As discussed previously, resources 126 may include compute instances, storage instances, and/or various components (e.g., processors, memories, etc.) to implement various instances. Additionally, the resources 126A-126N may include various networking devices that may implement specific network configuration requests (e.g., implement remapped IP addresses and route packets in accordance with the remapped configuration). Each instance in the data plane 132 can include at least one data store and a host manager component for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also may perform and/or mange the installation of software patches and upgrades for the data store and/or operating system. A host manger also can collect relevant metrics, such as may relate to CPU, memory, and I/O usage.

Once a resource 126 is allocated and a user is provided with a DNS address or other address or location, the user can send requests "directly" to the data plane 132 through the network 106 using a Java Database Connectivity (JDBC) or other such client to directly interact with that resource 126. A request received from client 102, for example, can be directed to a network address translation (NAT) router 124, or other appropriate component, which can direct the request to the actual instance resource 126 or host. Using such an approach, once the resource 126 has been configured through the control plane, a user, application, service, or component can interact with the resource 126 directly through requests to the data plane, without having to access the control plane 108.

Additionally, once the service request has been executed, the APIs 120 may submit a responsorial record to the block chain database 104. The responsorial record may be a transactional record to be stored in the block chain database 104 that indicates any action taken by the control plane 108 and/or the data plane 132 in response to receiving the service request. For example, if the service request is a request to launch a compute instance, the responsorial record may include text indicating that the instance has been launched. In another example, if the service request is a request to retrieve a file stored in a resource, the responsorial record may include text indicating that the file is available and/or it may include the file itself.

Figure 2:
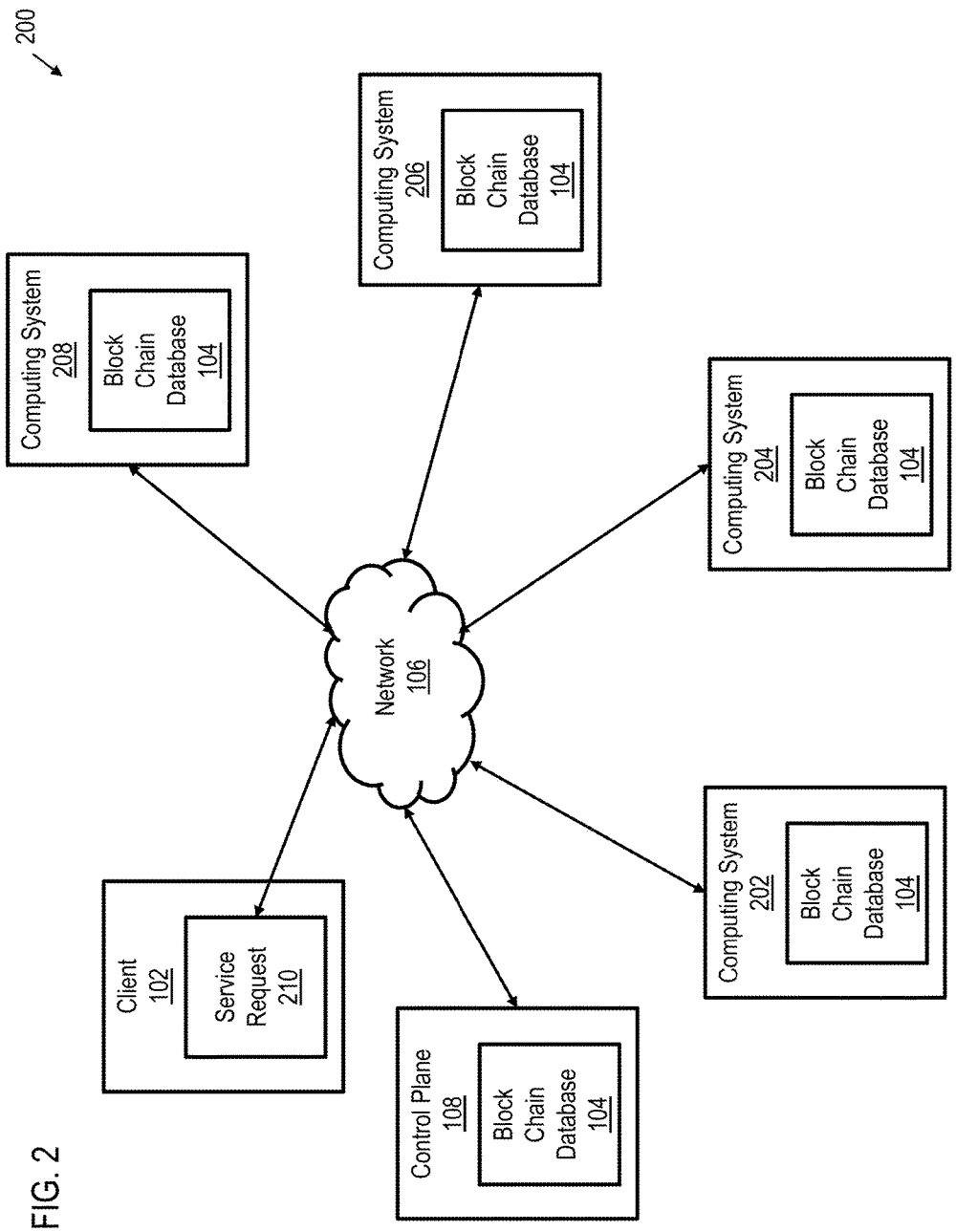
FIG. 2 shows a block diagram of an example interaction between a client and a plurality of computing systems, in accordance with various embodiments.

FIG. 2 shows a block diagram of an example interaction 200 between a client 102 and a plurality of computing systems 202-208 and control plane 108, in accordance with various embodiments. As discussed previously, client 102 may make a service request 210 in the form of a transactional record to be stored in block chain database 104. The service request 210 may be: a request for access to any of resources 126 of data plane 132, a request to store data in any of resources 126, and/or a request to retrieve data stored in any of resources 126. In some embodiments, a service request 210 may be in the form of a command, received from client 102, to provide a service (e.g., launch a virtual machine, store data, retrieve data, etc.). Because, in some embodiments requests that are stored in block chain database 104 must be paid for, the service request 210 may include a payment, utilizing a cryptocurrency that pays for the request. Block chain database 104 may be stored in any of control plane 108 and/or computing systems 202-208. In an embodiment, computing systems 202-208 may be controlled by third parties that are not associated with the parties that control client 102 and control plane 108. Thus, a copy of block chain database 104 is stored in multiple computing systems (e.g., hundreds, thousands, millions, etc.). In other words, block chain database 104 is a distributed database.

For example, client 102 may be configured to propagate service request 210 via network 106 and/or any other network to computing systems 202-208. Computing systems 202-208 receive service request 210. In some embodiments, service request 210 is encrypted. The service request may be encrypted utilizing any type of encryption method such as symmetric key encryption, public key encryption, etc. Therefore, the computing systems 202-208 may, in some embodiments, receive an encrypted representation of the service request 210. In alternative embodiments, the service request 210 is not encrypted and is propagated to computing systems 202-208 in plaintext. In this way, the service request 210 is propagated to third party computing systems in order to be stored in block chain database 104.

In some embodiments, service request 210 may be propagated only to control plane 108 to execute the request. For example, instead of propagating service request 210 to computing systems 202-208 to store the request in block chain database 104, service request 210 is propagated directly to control plane 108 via network 106. A digest (i.e., a HMAC and/or a hash) of the request 210 then may be propagated as a transaction to the remaining nodes of the network 106, such as computing systems 202-208. In this way, instead of the service request 210 itself being propagated to be stored in block chain database 104, only a digest of the service request 210 is propagated to the computing systems 202-208 to be stored in block chain database 104. This ensures that, while the digest of the request will be public, the actual service request 210 is not public. In some embodiments, the service request received directly from the client 102 via network 106 is executed only after the digest is received by the control plane 108. In other words, the service request is executed in response to the control plane 108 receiving the digest stored in the block chain database 104.

Figure 3:
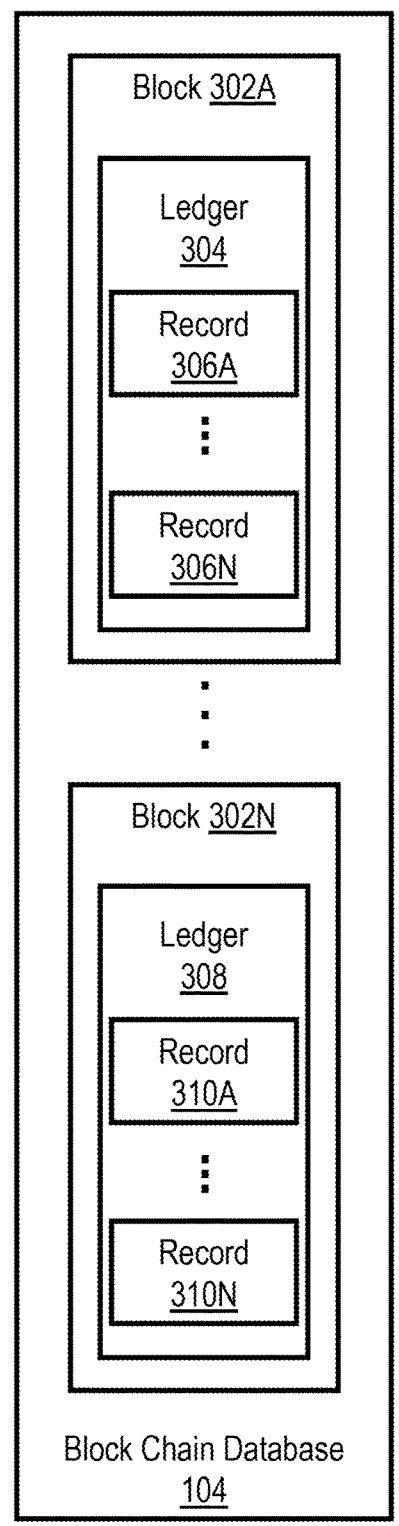
FIG. 3 shows a block diagram of an example block chain database, in accordance with various embodiments.

FIG. 3 shows a block diagram of example block chain database 104, in accordance with various embodiments. Block chain database 104 may include any suitable number of blocks 302A-302N as indicated by the ellipses. In each block 302A-302N, a ledger of transactional records is stored. For example, ledger 304, which comprises any suitable number of transactional records 306A-306N as indicated by the ellipses, is stored in block 302A. Similarly, ledger 308, which comprises any suitable number of transactional records 310A-310N as indicated by the ellipses, is stored in block 302N. Therefore, each of blocks 302A-302N is a group of transactional records (i.e., records 306A-306N for block 302A and records 310A-310N for block 302N). In some embodiments, each block is "chained" or contains information that relates it to the previous block in the block chain database 104. For instance, a new block added to the block chain database 104 may be a cryptographic hash (e.g., utilizing the SHA-256 hash algorithm) of the immediately previous block in the block chain database 104.

For example, each of computing systems 202-208 from FIG. 2 may be configured to "mine" or add a block, such as block 302N to the block chain database 104. In this example, block 302A already exists in the block chain database 104. Mining is the process of adding transactional records, such as records 310A-310N to the block chain database 104. Therefore, each of computing systems 202-208 receives many transactions, including the service request 210, from many computing systems. At the same time, the computing systems 202-208 attempt to mine the new block 302N. In order to successfully mine the block 302N, one of computing systems 202-208 may provide a proof-of-work to the remaining computing systems in the network. In some embodiments, the proof-of-work requires one of computing systems 202-208 to determine an arbitrary nonce, such that when hashed, the block content along with the arbitrary nonce is smaller than some target value. Each of the computing systems 202-208 may verify the proof-of-work; however, due to the arbitrary nature of the nonce, it may be very time and resource consuming to generate. Thus, in some embodiments, a reward is given to the first of the computing systems 202-208 to generate the proof-of-work (e.g., a certain amount of cryptocurrency).

In this example, as previously stated, each of computing systems 202-208 receive transactions, including service request 210, while attempting to mine block 302N. Once the first of the computing systems 202-208 successfully mines the block 302N (e.g., computing system 202), the transactions received by computing system 202, including service request 210, are aggregated into transactional records 310A-310N. For example, service request 210 may be aggregated into record 310A. Then block 302N, along with all of the transactional records 310A-310N, is propagated to the remaining nodes in the network, including computing systems 204-208, client 102, and control plane 108. Therefore, the ledger 208 that includes records 310A-310N is received by computing systems 204-208, client 102, and control plane 108. Thus, each of the nodes of the network 106 receives the service request 210 and/or, if service request 210 is encrypted, a representation of service request 210, in the form of record 310A. Each of computing systems 202-208 then may attempt to mine an additional block to incorporate additional transactions into the block chain database 104.

Because any additional blocks are chained to the previous blocks and the proof-of-work system, any modifications to any block is extremely difficult. For example, in order to modify a record stored in block 302N after block 302N is propagated to computer systems 204-208, any subsequent block committed to the block chain must also be modified in order for the modifications to be accepted. Additionally, since the block chain database 104 is stored in a distributed manner in a number of computing systems (e.g., hundreds, thousands, millions, etc.), any modification to a record in a single copy of the block chain database 104 by a single party (e.g., control plane 108's copy), will not be accepted by the remaining nodes of the network because only one copy contains the modification while the remaining nodes do not. Therefore, once a record, such as record 310A, is stored in the block chain database 104 and distributed to the remaining nodes of the network, it is very difficult to modify.

Figure 4:
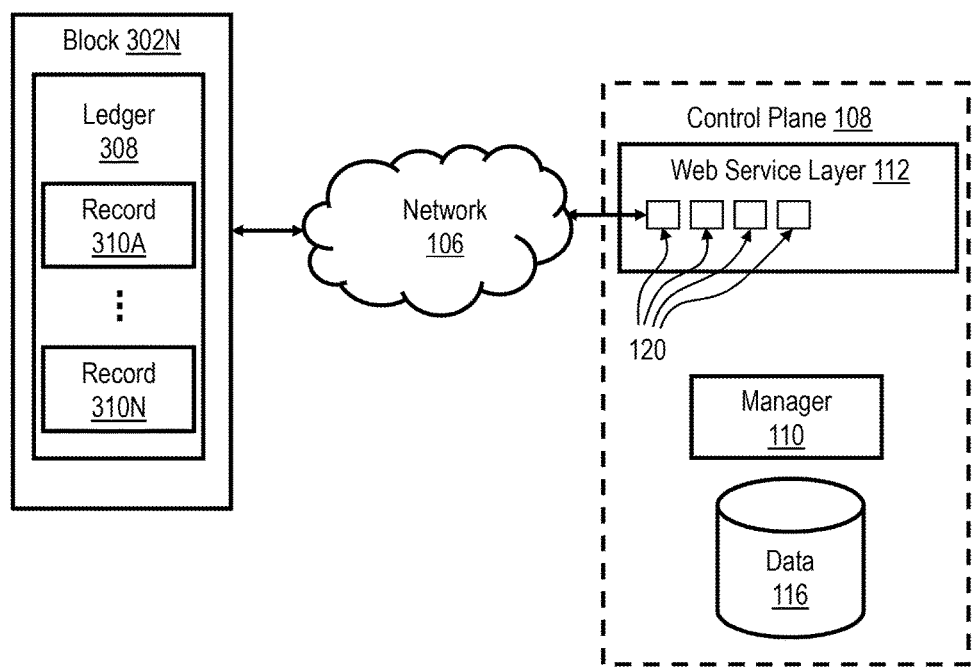
FIG. 4 shows a block diagram of an example interaction between a block of a block chain database and a control plane of a distributed computing environment, in accordance with various embodiments.

FIG. 4 shows a block diagram of an example interaction between block 302N of block chain database 104 and control plane 108 of the distributed computing environment, in accordance with various embodiments. As discussed previously, once one of the computer systems 202-208 mines block 302N, block 302N, including record 310A which contains the service request 210, is propagated to the other nodes of the network 106, including control plane 108. Block 302N is received by at least one of the APIs 120. The Web service layer 112 then may analyze the records contained in block 302N, as listed in ledger 308, to determine whether any of the records 310A-310N is a service request for a service provided by the distributed computing environment. Because, continuing the previous example, record 310A contains service request 210, Web services layer 112 determines that record 310A is a service request. In embodiments in which the service request 210 is encrypted in record 310A, the Web services layer 112 may be configured to decrypt the record utilizing any type of decryption method such as symmetric key decryption, public key decryption, etc.

Manager 110 may be configured to authenticate the service request 210 by verifying the digital signature attached to the request. Thus, manager 110 is configured to determine that the service request 210 contained in record 310A has actually come from client 102. In some embodiments, the digital signature can be validated by the manager 110 by generating a hash of the message and use a copy of the client's key to encrypt the hash. If the encrypted hash matches the digital signature then the manager 110 can determine that the request is valid. In some embodiments, a two man or woman rule may be implemented that requires two digital signatures within a predetermined amount of time for authentication. In these embodiments, only after two digital signatures are verified within the predetermined amount of time, will the manager 110 determine that the service request 210 is authentic. If manager 110 is unable to authenticate the service request 210, then manager 110 may not execute the request. For example, the manager 110 may not allocate any of resources 126, store data in any of resources 126, and/or retrieve data stored in any of resources 126 in response to the service request 210. In other words, manager 110 may deny access to resources 126, if manager 110 is unable to authenticate that service request 210 has been transmitted by client 102. However, if manager 110 authenticates the service request 210, then manager 110 executes the request. For example, the manager 110 may allocate the resources 126, store data in any of resources 126, and/or retrieve data stored in any of resources 126 as requested in the service request 210. Block 302N then may be stored in data store 116 along with the remaining blocks of block chain database 104.

Figure 5:
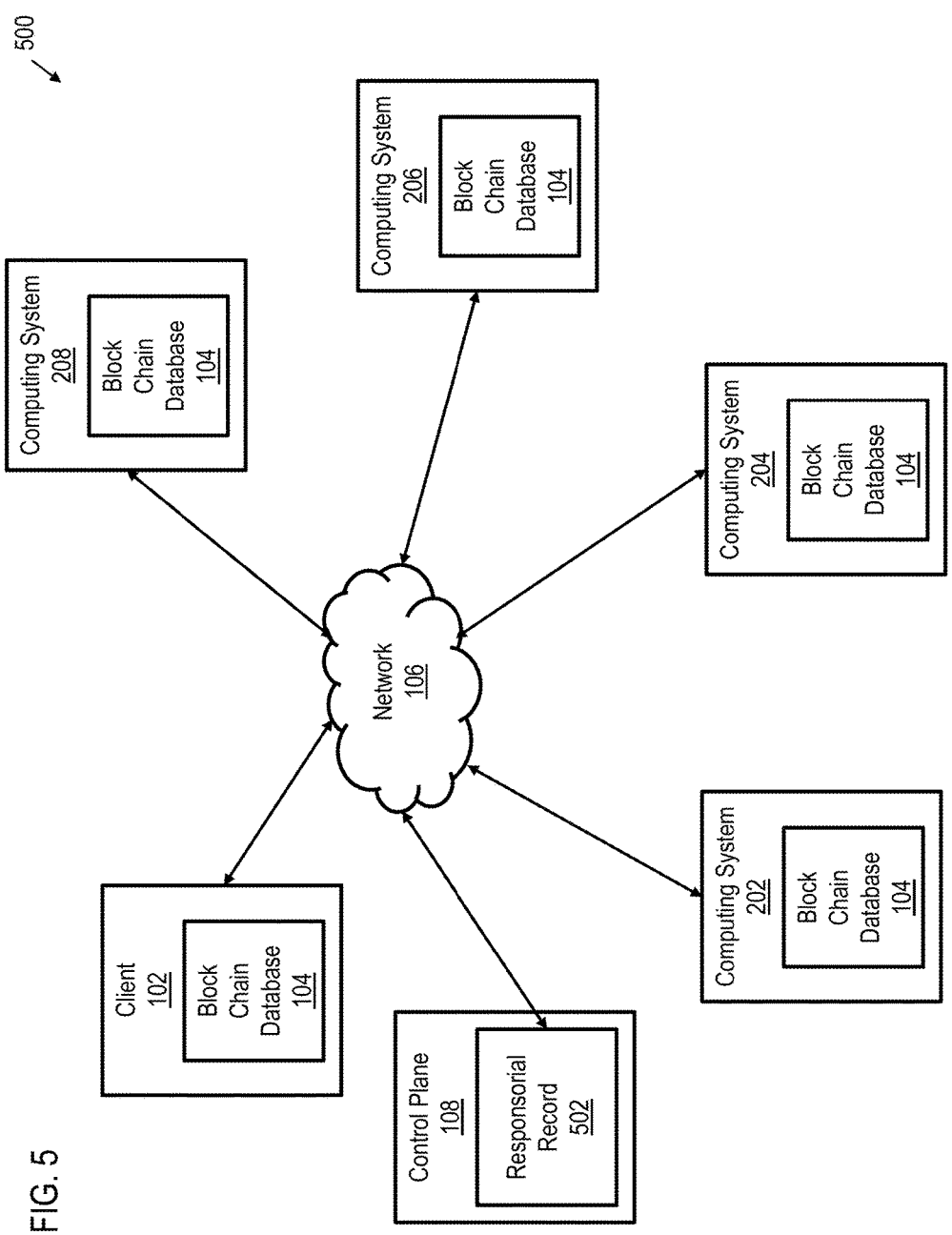
FIG. 5 shows a block diagram of an example interaction between a control plane of a distributed computing environment and a plurality of computing systems, in accordance with various embodiments.

FIG. 5 shows a block diagram of an example interaction 500 between control plane 108 of a distributed computing environment and a plurality of computing systems 202-208 and client 102, in accordance with various embodiments. As discussed previously, control plane 108 may execute service request 210 in response receiving service request 210 in the form of transactional record 310A stored in block chain database 104. Once the service request 210 is executed, the control plane 108 may submit a responsorial record 502 to the block chain database 104. Thus, the APIs 120 may transmit responsorial record 502 as a transaction to the client 102 and computing systems 202-208 utilizing network 106. The responsorial record 502 may include an identifier that identifies any action taken in response to receiving the service request 210. For example, if the service request 210 is a request to launch a compute instance, the responsorial record 502 may include text indicating that the instance has been launched. In another example, if the service request 210 is a request to retrieve a file stored in a resource 126, the responsorial record 502 may include text indicating that the file is available and/or it may include the file itself.

As discussed, in order to submit the responsorial record 502 to block chain database 104, the APIs 120 may be configured to propagate responsorial record 502 via network 106 and/or any other network to computing systems 202-208. Computing systems 202-208 receive the responsorial record 502. In some embodiments, the responsorial record 502 is encrypted. The responsorial record 502 may be encrypted utilizing any type of encryption method such as symmetric key encryption, public key encryption, etc. Therefore, the computing systems 202-208 may, in some embodiments, receive an encrypted representation of the responsorial request 502. In alternative embodiments, the responsorial request 502 is not encrypted and is propagated to computing systems 202-208 in plaintext. In this way, the responsorial request 502 is propagated to third party computing systems in order to be stored in block chain database 104.

In this example, each of computing systems 202-208 receive transactions, including responsorial record 502, while attempting to mine the next block of block chain database 104. Once the first of the computing systems 202-208 successfully mines the next block (e.g., computing system 202), the transactions received by computing system 202, including responsorial record 502, are aggregated into transactional records stored in a ledger of the block. The next block, along with all of the transactional records received while mining the next block, is then propagated to the remaining nodes in the network, including computing systems 204-208, client 102, and control plane 108. Therefore, all of the transactional records in the next block are received by computing systems 204-208, client 102, and control plane 108. Thus, each of the nodes of the network 106 receives the responsorial record 502 and/or, if responsorial record 502 is encrypted, an encrypted representation of responsorial record 502. Because the block chain database 104 has the service request 210 stored in blocks 302A-302N of the block chain database 104 and, in some embodiments, the responsorial record 502 stored in another block of block chain database 104, and because the records within the block chain database 104 are extremely difficult to modify, a very robust audit of any request made by client 102 and actions taken in response to the request is maintained and stored in a distributed network of computers.

In some embodiments, service request 210 may be propagated only to control plane 108 to execute the request. For example, instead of propagating service request 210 to computing systems 202-208 to store the request in block chain database 104, service request 210 is propagated directly to control plane 108 via network 106. The service request 210 then may be executed by the control plane 108 and/or the data plane 132. The responsorial record 502 then may be stored in the block chain database 104 as discussed above. In other words, in some embodiments, the service request 210 is not stored in the block chain database 104; however, an audit log is stored in the block chain database 104.

Figures 6, 7:
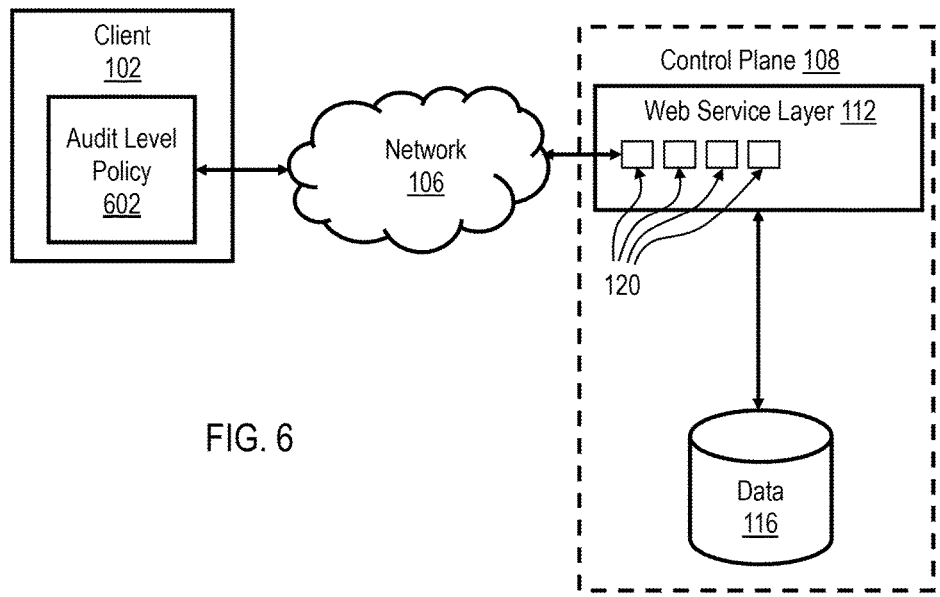
FIG. 6 shows a block diagram of an example interaction between a client and a control plane of a distributed computing environment, in accordance with various embodiments.
FIG. 7 shows an example audit level policy that may be utilized for executing service requests in a distributed computing environment, in accordance with various embodiments.

FIG. 6 shows a block diagram of an example interaction between a client 102 and a control plane 108 of a distributed computing environment, in accordance with various embodiments. In some embodiments, client 102 may transmit an audit level policy 602 to control plane 108. Audit level policy 602 may include instructions that may require certain service requests be received as a transactional record in a block of the block chain database 104 in order to execute those requests. In other words, the audit level policy 602 may include a list of commands that can be invoked or resources that may only be accessed after receiving a service request (e.g., a request for access to a resource) in a record stored in one of the blocks of the block chain database 104. The audit level policy 602 may be received via network 106 by APIs 120 of Web service layer 112 of control plane 108 and stored in data store 116.

For example, FIG. 7 shows example audit level policy 602 that may be utilized for executing service requests in a distributed computing environment, in accordance with various embodiments. The audit level policy 602 may include a table 700 that includes a column that lists specific resources, such as resources 126A-126N, and/or services that may be accessed and/or executed in data plane 132. The table 700 may also include a second column that lists whether a specific resource and/or service requires a service request to that specific resource and/or service to be received as a record in a block of the block chain database 104. In the example of FIG. 7, resource 126A requires a service request for access to resource 126A to be received as a record in a block of the block chain database 104. Therefore, in order to access resource 126A, the control plane 108 must receive a service request 210 requesting access to resource 126A as a record, such as record 310A, from a block, such as block 302N, of block chain database 104. If the control plane 108 receives service request 210 requesting access to resource 126A directly from client 102 or in any other way other than in the form of record 310A, then manager 110 denies the client 102 access to resource 126A. In other words, if the control plane 108 does not receive a service request 210 in the form of record 310A for a service in table 700 that requires a data block chain audit trail, then manger 110 may not execute the service request. However, if the control plane 108 receives the service request 210 to resource 126A as record 310A in block 302N, then, the manager 110 may allocate resource 126A to the client 102. In other words, if the control plane 108 receives the service request 210 in the form of record 310A, then manager 110 executes the service request.

In this example, a service request that requests access to resource 126N does not require that the request be received as a record in a block of the block chain database 104. Therefore, the control plane 108 may receive the service request 210 requesting access to resource 126N as a record from a block of block chain database 104 and/or directly from client 102. The manager 110 may allocate the resource 126N based on receiving the service request 210 requesting access to resource 126N even if it is not received in the form of a record in a block of block chain database 104. In other words, for a service in table 700 that does not require a data block chain audit trail, a service request 210 may be received directly from the client 102 and executed by manager 110. In this way, client 102 and/or a user of client 102 may institute a policy of when to require the use of the block chain database 104 to execute service requests. Thus, in some embodiments, the client may require only the most risk sensitive services, as defined by client 102, in the audit level policy 602 to require a data block chain audit trail.

In further embodiments, audit level policy 602 may include instructions that provide what types of responsorial records that are to be committed to the block chain database 104. In other words, the audit level policy 602 may include instructions that a responsorial record 502 is to be stored in the block chain database 104 only under certain conditions. For example, the audit level policy 602 may include instructions that provide that a responsorial record 502 is to be stored in block chain database for: service requests that specifically request a responsorial record 502 be stored in the block chain database 104, service requests from a specific user, service requests for a specific service and/or resource, etc. In this way, a user may utilize the audit level policy 602 to further define what data is stored in the block chain database 104.

Figure 8:
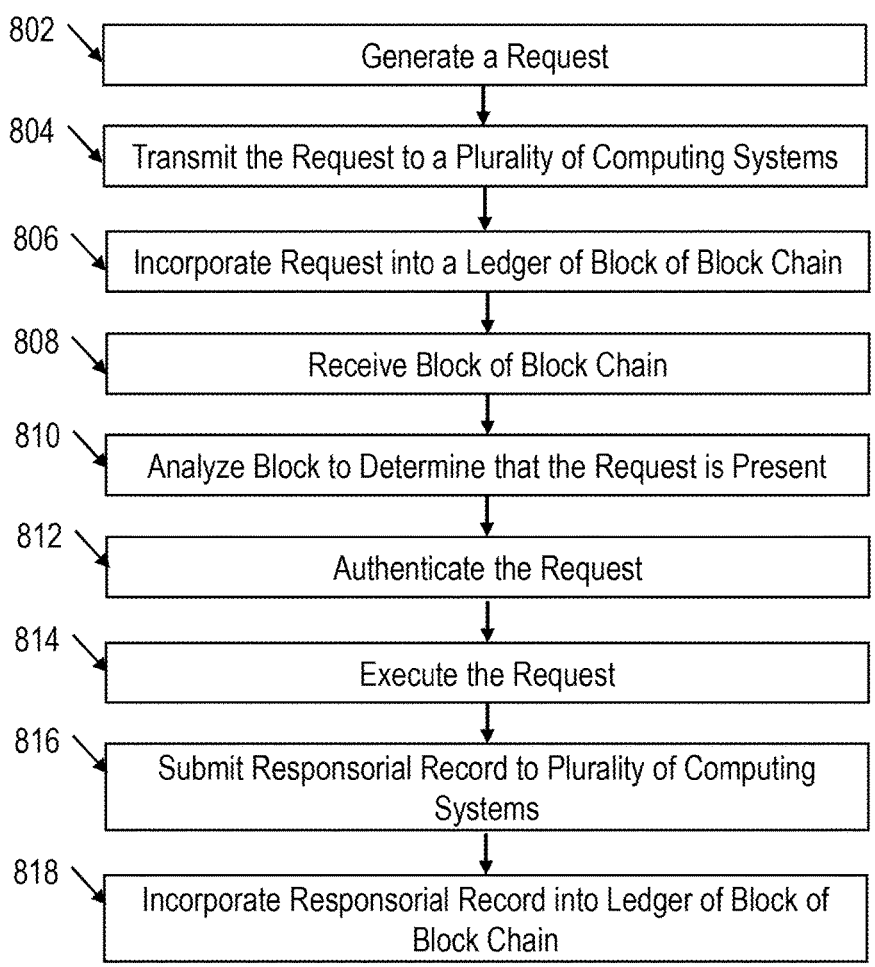
FIG. 8 shows a flow diagram illustrating aspects of operations that may be performed to execute service requests in a distributed computing environment, in accordance with various embodiments.

FIG. 8 shows a flow diagram illustrating aspects of operations that may be performed to execute service requests in a distributed computing environment, in accordance with various embodiments. As shown in element 802, a service request for a service provided by a distributed computing environment is generated. A client 102 may generate the service request, such as service request 210. For example, client 102 may generate a request to launch a compute instance, to store data in a storage instance, and/or to retrieve data stored in a storage instance. In element, 804, the storage request is transmitted to a plurality of computing systems. For example, client 102 may transmit service request 210 to computing systems 202-208 in order to store the request as a transaction record in block chain database 104.

In element 806, the service request is incorporated into a ledger of a block of a block chain database. For example, after and/or during the service request 210 being received by the computing systems 202-208, each of the computing systems 202-208 may mine block chain database 104 to attempt to create a new block, such as block 302N. Once one of the computing systems 202-208 (e.g., computing system 202) satisfactorily creates block 302N by, in some embodiments, performing a proof-of-work, transactions received by computing system 202 since the creation of the previous block in block chain database 104 may be aggregated in ledger 308 as transaction records 310A-310N. Thus, the service request 210 is incorporated into the ledger 308 as one of the records 310A-310N (e.g., record 310A), and/or an encrypted representation of the service request 210 is incorporated as one of the records 310A-310N.

In element 808, a block of the block chain database is received by the control plane. For example, the newest block created for the block chain database 104 (e.g., block 302N) is propagated by the creating computing system (e.g., computing system 202) to the remaining nodes of the network 106, including control plane 108. Block 302N includes all of the transactional records 310A-310N included in ledger 308. In element 310, the block is analyzed to determine whether a service request is stored in the block. For example, the Web services layer 112 may analyze block 302N to determine whether any of records 310A-310N is a service request 210. In this example, since record 310A is a service request 210 and/or an encrypted representation of service request for access 210, the Web services layer 112 determines that a service request is stored in block 302N. In some embodiments, as a part of this analysis, the received block is a verified to determine that it is a verified block in the block chain. In other words, in determining that the block is present, the Web services layer 112 may determine whether the block has propagated to enough nodes to be considered a part of the block chain. In element 812, the service request is authenticated. For example, manager 110 of control plane 108 may authenticate the service request 210 by verifying a digital signature attached to the request. In other words, manager 110 may act to determine whether the service request 210 contained in record 310A has actually come from client 102.

In element 814, the request is executed. In other words, once the manager 110 has determined that the service request 210 is authentic, the manager 110 then may execute the request. For example, if the service request is a request to allocate a resource to client 102, then the manager 110 may allocate the resource to the client 102. If the service request is a request to store data in a resource, then the manager 110 may store the requested data in the resource. If the service request is a request to retrieve data stored in a resource, then the manager 110 may retrieve the stored data from the resource. In element 816, a responsorial record is submitted to a plurality computing systems. For example, responsorial record 502 is submitted (e.g., transmitted) to computing systems 202-208. The responsorial record 502 may include an identifier that identifies an action taken in response to receiving the service request 210. For example, if the service request 210 is a request to launch a compute instance, the responsorial record 502 may include text indicating that the instance has been launched. In another example, if the service request 210 is a request to retrieve a file stored in a resource, the responsorial record 502 may include text indicating that the file is available and/or it may include the file itself. In element 818, the responsorial record is incorporated into a ledger of a block of the block chain database. For example, after and/or during the responsorial record 502 being received by the computing systems 202-208, each of the computing systems 202-208 may mine block chain database 104 to attempt to create a new block. Once one of the computing systems 202-208 (e.g., computing system 202) satisfactorily creates the new block by, in some embodiments, performing a proof-of-work, transactions received by computing system 202 since the creation of the previous block in block chain database 104 may be aggregated in a ledger as transaction records. Thus, the responsorial record 502 is incorporated into the ledger as one of the records in the new block, and/or an encrypted representation of the responsorial record 502 is incorporated as one of the records of the new block. The updated block chain database then may be propagated to each of the nodes in the network, including the client 102.

Figure 9:
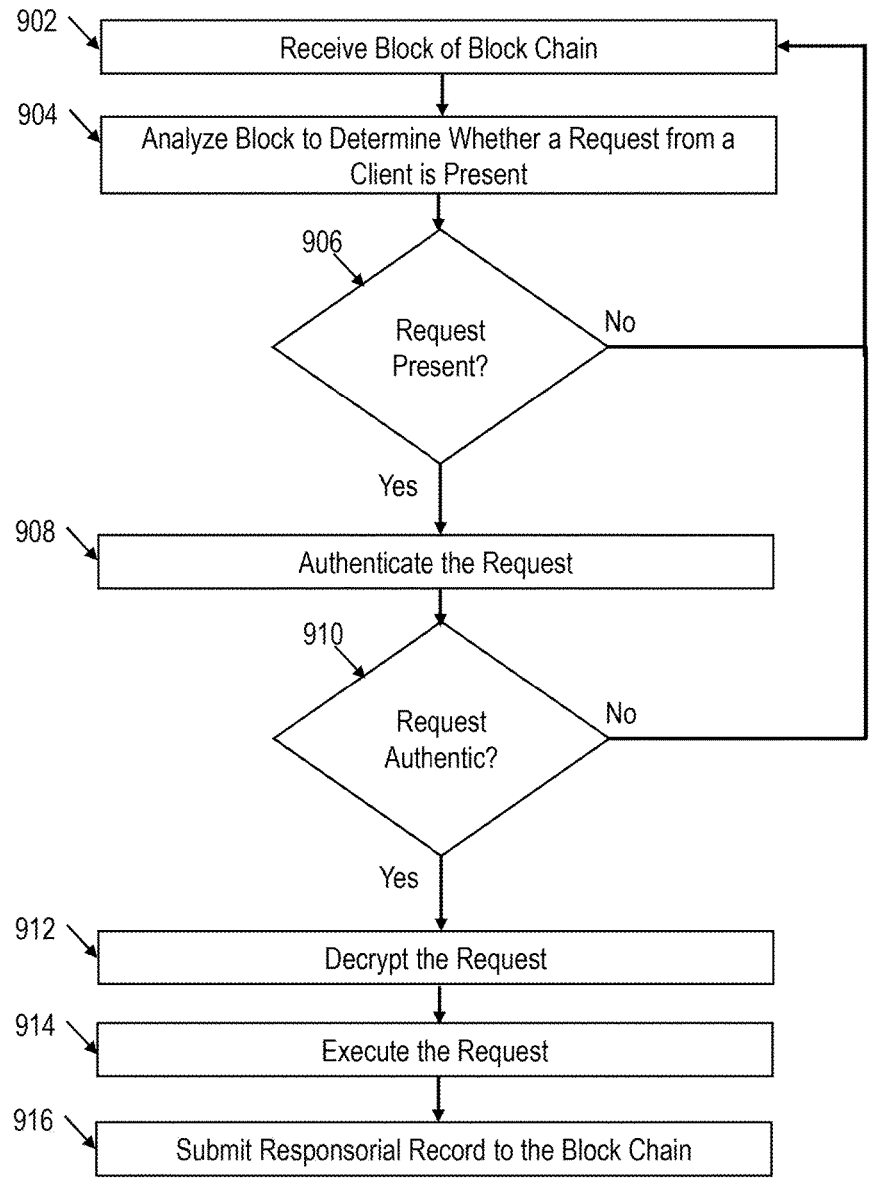
FIG. 9 shows a flow diagram illustrating aspects of operations that may be performed to execute service requests in a distributed computing environment, in accordance with various embodiments.

FIG. 9 shows a flow diagram illustrating aspects of operations that may be performed to execute service requests in a distributed computing environment, in accordance with various embodiments. In element 902, a block of a block chain database is received. For example, the newest block created for block chain database 104 (e.g., block 302N) is propagated by the creating computing system (e.g., computing system 202) to the remaining nodes of the network 106, including control plane 108. Block 302N includes all of the transactional records 310A-310N included in ledger 308. In element 904, the block is analyzed to determine whether a service request is stored in the block. In block 906, a determination is made as to whether a service request is present in the received block. For example, the Web services layer 112 may analyze block 302N to determine whether any of records 310A-310N is a service request 210. If in element 906, a determination is made that a service request is not present in the received block, then the method continues in element 902 with receiving another block of the block chain database. For example, if none of records 310A-310N in block 302N is a request for access, then the control plane 108 does not execute any service requests (e.g., allocate any resource) and waits to receive another block from the block chain database 104. However, if in element 906, a determination is made that a service request is present in the received block, then the method continues in element 908 with authenticating the request. For example, if record 310A is a service request 210 and/or an encrypted representation of service request 210, the Web services layer 112 determines that a service request is stored in block 302N and manager 110 authenticates the request.

In element 910, a determination is made as to whether the service request is authentic. For example, manager 110 may determine whether the service request 210 that is present in the control plane 108 as record 310A is authentic by authenticating the digital signature attached to the service request 210. If in element 910, a determination is made that the service request is not authentic, then the method continues in element 902 with receiving another block of the block chain database. For example, if manager 110 is unable to determine that the digital signature attached to the request for access 210 is authentic, then the request is not executed (e.g., access to the resource may be denied) and the control plane 108 waits to receive another block from the block chain database 104. However, if in element 910, a determination is made that the service request is authentic, then the method continues in element 912 with decrypting the service request. For example, if manager 110 determines that the digital signature attached to the service request 210 is authentic, then, because the service request 210 may be encrypted in the record 310A, the Web services layer 112 may decrypt the message utilizing any decryption method (e.g., symmetric key decryption, public key decryption, etc.).

In element 914, the service request is executed. In other words, once the manager 110 has determined that the service request 210 is authentic and the Web services layer 112 has decrypted the service request 210, the manager 110 then may execute the request. For example, if the service request is a request to allocate a resource to client 102, then the manager 110 may allocate the resource to the client 102. If the service request is a request to store data in a resource, then the manager 110 may store the requested data in the resource. If the service request is a request to retrieve data stored in a resource, then the manager 110 may retrieve the stored data from the resource. In element 916, a responsorial record is submitted to a plurality of computing systems. For example, responsorial record 502 is submitted (e.g., transmitted) to computing systems 202-208. The responsorial record 502 may include an identifier that identifies an action taken in response to receiving the service request 210. For example, if the service request 210 is a request to launch a compute instance, the responsorial record 502 may include text indicating that the instance has been launched. In another example, if the service request 210 is a request to retrieve a file stored in a resource, the responsorial record 502 may include text indicating that the file is available and/or it may include the file itself.

Figure 10:
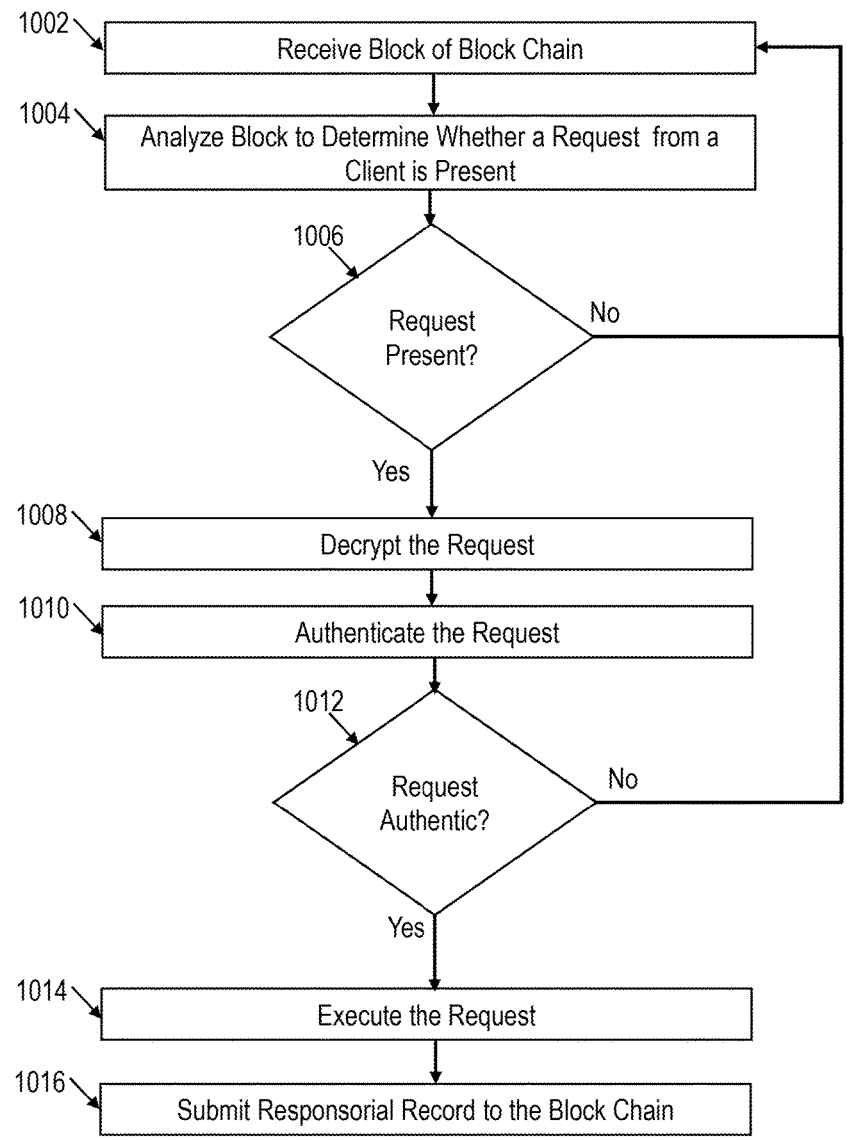
FIG. 10 shows a flow diagram illustrating aspects of operations that may be performed to execute service requests in a distributed computing environment, in accordance with various embodiments.

FIG. 10 shows a flow diagram illustrating aspects of operations that may be performed to execute service requests in a distributed computing environment, in accordance with various embodiments. In element 1002, a block of a block chain database is received. For example, the newest block created for block chain database 104 (e.g., block 302N) is propagated by the creating computing system (e.g., computing system 202) to the remaining nodes of the network 106, including control plane 108. Block 302N includes all of the transactional records 310A-310N included in ledger 308. In element 1004, the block is analyzed to determine whether a service request is stored in the block. In block 1006, a determination is made as to whether a service request is present in the received block. For example, the Web services layer 112 may analyze block 302N to determine whether any of records 310A-310N is a service request 210. If in element 1006, a determination is made that a service request is not present in the received block, then the method continues in element 1002 with receiving another block of the block chain database. For example, if none of records 310A-310N in block 302N is a request for access, then the control plane 108 does not execute any service requests (e.g., allocate any resource) and waits to receive another block from the block chain database 104. However, if in element 1006, a determination is made that a service request is present in the received block, then the method continues then the method continues in element 1008 with decrypting the service request. For example, if manager 110 determines that the digital signature attached to the service request 210 is authentic, then, because the service request 210 may be encrypted in the record 310A, the Web services layer 112 may decrypt the message utilizing any decryption method (e.g., symmetric key decryption, public key decryption, etc.).

In element 1010, the service request is then authenticated. In element 1012, a determination is made as to whether the service request is authentic. For example, manager 110 may determine whether the service request 210 that is present in the control plane 108 as encrypted record 310A is authentic by authenticating the digital signature attached to the service request 210. If in element 1012, a determination is made that the service request is not authentic, then the method continues in element 1002 with receiving another block of the block chain database. For example, if manager 110 is unable to determine that the digital signature attached to the request for access 210 is authentic, then the request is not executed (e.g., access to the resource may be denied) and the control plane 108 waits to receive another block from the block chain database 104. However, if in element 1012, a determination is made that the service request is authentic, in element 1014, the service request is executed. In other words, once the Web services layer has decrypted the service request 210 and the manager determined that the service request 210 is authentic, the manager 110 then may execute the request. For example, if the service request is a request to allocate a resource to client 102, then the manager 110 may allocate the resource to the client 102. If the service request is a request to store data in a resource, then the manager 110 may store the requested data in the resource. If the service request is a request to retrieve data stored in a resource, then the manager 110 may retrieve the stored data from the resource. In element 1016, a responsorial record is submitted to a plurality of computing systems. For example, responsorial record 502 is submitted (e.g., transmitted) to computing systems 202-208. The responsorial record 502 may include an identifier that identifies an action taken in response to receiving the service request 210. For example, if the service request 210 is a request to launch a compute instance, the responsorial record 502 may include text indicating that the instance has been launched. In another example, if the service request 210 is a request to retrieve a file stored in a resource, the responsorial record 502 may include text indicating that the file is available and/or it may include the file itself.

Figure 11:
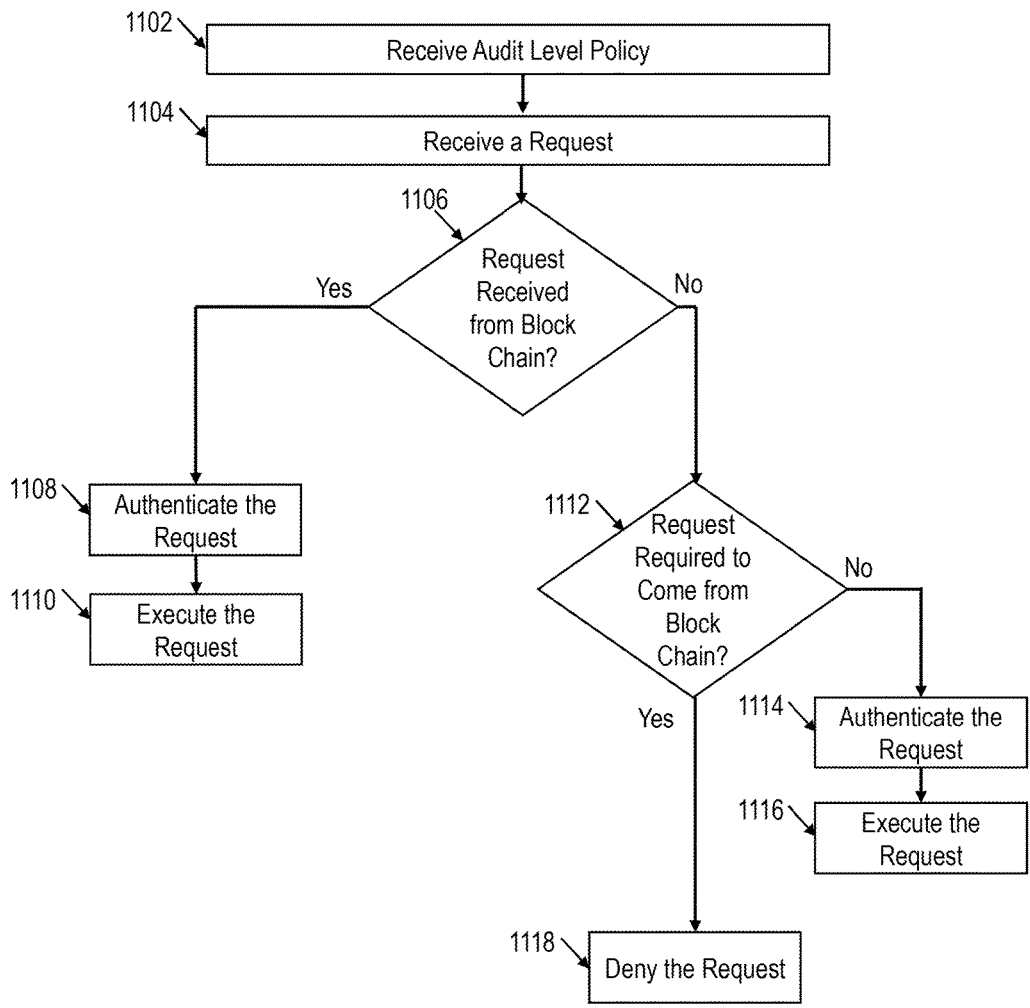
FIG. 11 shows a flow diagram illustrating aspects of operations that may be performed to execute service requests in a distributed computing environment, in accordance with various embodiments.

FIG. 11 shows a flow diagram illustrating aspects of operations that may be performed to execute service requests in a distributed computing environment, in accordance with various embodiments. In element 1102, an audit level policy is received by the control plane. For example, audit level policy 602 may be received from client 102 by APIs 120 in control plane 108. The audit level policy 602 may include instructions that may require certain service requests to be received as a transactional record in a block of the block chain database 104 in order to execute those requests. In other words, the audit level policy 602 may include instructions that require, in order to execute a specific service request (e.g., allocate resource 126A), the control plane 108 must receive a service request 210 as a record, such as record 310A, from a block, such as block 302N, of block chain database 104. In element 1104, a service request for a service provided by the distributed computing environment is received by the control plane. For example, service request 210 is received by the control plane 108.

In element 1106, a determination is made as to whether the service request is received in the form of a record in a block of a block chain database. For example, a determination is made within the control plane 108 whether the service request 210 was received as a record (e.g., record 310A) in a block (e.g., block 302N) of block chain database 104 or if the service request was received directly from client 102. If in element 1106, a determination is made that the received service request is received in the form of a record in a block of a block chain database, then the method continues in element 1108 with authenticating the service request. For example, manager 110 of control plane 108 may authenticate the service request 210 by verifying a digital signature attached to the request. In other words, manager 110 may act to determine whether the service request 210 contained in record 310A has actually come from client 102. In element 1110, the request is executed. For example, once the manager 110 has determined that the request for access 210 is authentic, the manager 110 then may allocate a resource to the client 102, store data in a resource, and/or retrieve data from a resource.

If, in element 1106, a determination is made that the received service request is not received in the form of a record in a block of a block chain database, then the method continues in element 1112 with determining whether the service request is required to be in the form of a record in a block of a block chain database. For example, a determination is made, in some embodiments utilizing audit level policy 602, whether a specific resource and/or specific service requested requires that the request come from a block of block chain database 104. For instance, a determination is made whether table 700 of the audit level policy 602 requires that the specific resource (e.g., resource 126A and/or resource 126N) and/or service require a block chain audit trail. If in element 1112, a determination is made that the service request is not required to be in the form of a record in a block of a block chain database, then the method continues in element 1114 with authenticating the service request. For example, if the service request 210 is for access to resource 126N which does not require a request to come in the form of a transactional record in a block of a block chain database, manager 110 of control plane 108 may authenticate the service request 210 by verifying a digital signature attached to the request. In element 1116, the service request is executed. For example, once the manager 110 has determined that the service request 210 is authentic, the manager 110 then may allocate a resource to the client 102, store data in a resource, and/or retrieve data from a resource. If, however, in element 1112 a determination is made that the service request is required to be in the form of a record in a block of a block chain database, then the method continues in element 1118 with denying the request (e.g., denying access to the resource). For example, if the service request 210 is for access to resource 126A which requires a request to come in the form of a transactional record in a block of a block chain database, then the manager 110 denies access to resource 126A.

Figure 12:
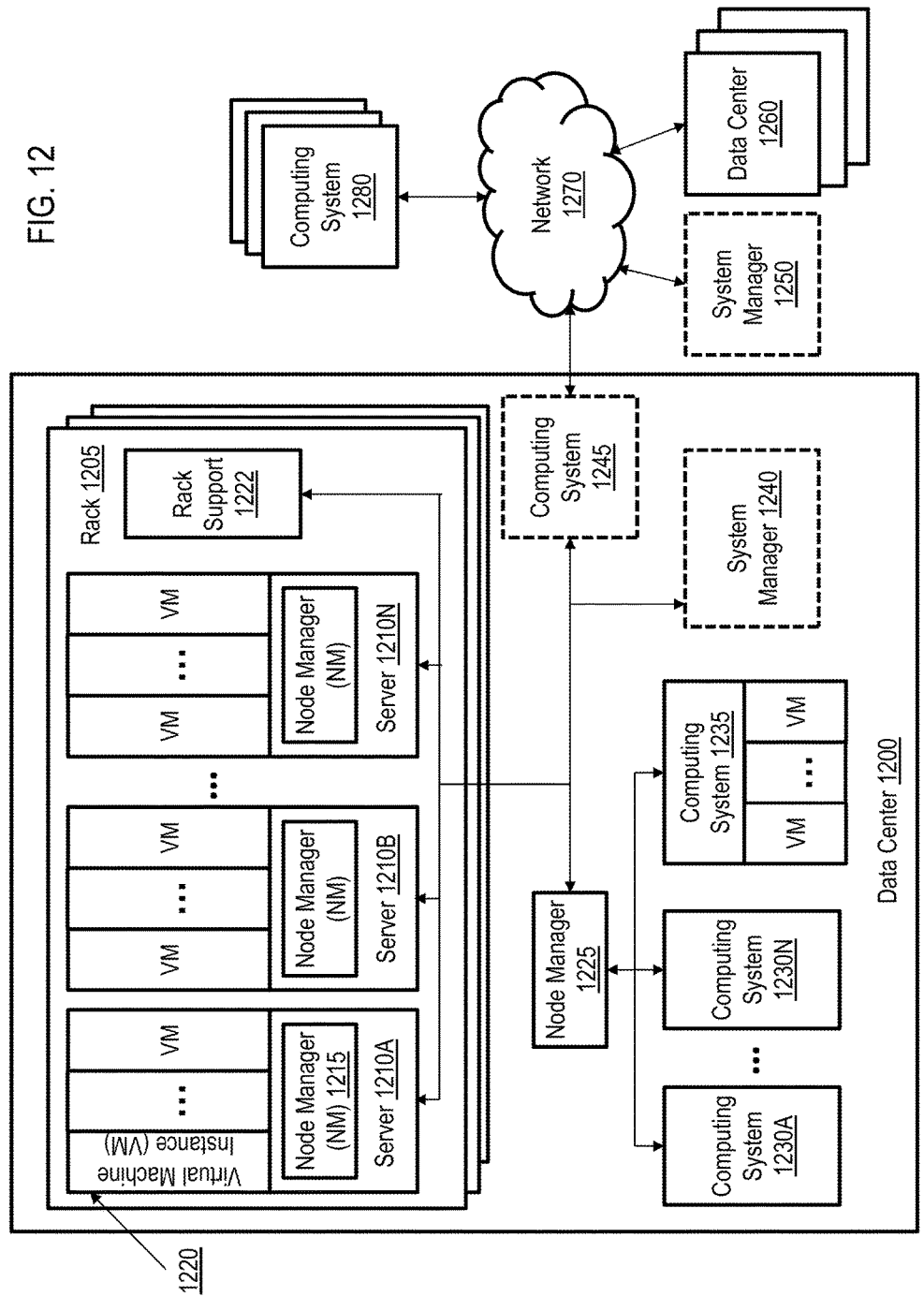
FIG. 12 shows a block diagram of a distributed computing environment, in accordance with various embodiments.

In at least some embodiments, a portion or all of one or more of the technologies described herein, including the techniques to implement the control plane, data plane, and/or resources, may be implemented in a distributed computing environment, such as shown in FIG. 12. In particular, in this example a program execution service manages the execution of programs on various computing systems located within a data center 1200. Data center 1200 includes a number of racks 1205, and each rack includes a number of computing systems 1210A-N, as well as a rack support computing system 1222 in this example embodiment. The computing systems 1210 each host one or more virtual machine instances 1220 in this example, as well as a distinct node manager 1215 to manage the virtual machines. In this example, each virtual machine 1220 may be employed to provide an independent computing environment for executing an instance of program. In this example, the rack support computing system 1222 may provide various utility services for other computing systems local to the rack, as well as possibly to other computing systems located in the data center 1200. The utility services may include, for example, data and/or program storage for other computing systems, execution of one or more machine manager modules to support other computing systems, etc. Each computing system 1210 may alternatively have a distinct machine manager module (e.g., provided as part of the node manager for the computing system) and/or have local storage (not shown) to store local copies of programs. The computing systems 1210 and the rack support computing system 1222 all share a common data exchange medium in this example, and may all be part of a single group. This common data exchange medium may be connected to one or more external data exchange mediums shared by, for example, other racks or computing systems in the data center 1200.

In addition, the example data center 1200 further includes additional computing systems 1230A-N and 1235 that share a common data exchange medium with a node manager 1225, and node manager 1225 manages computing systems 1230 and 1235. In the illustrated example, computing system 1235 also hosts a number of virtual machines as execution environments for use in executing program instances for one or more users, while computing systems 1230 do not host distinct virtual machines. In this example, an optional computing system 1245 resides at the interconnect between the data center 1200 and an external network 1270. The optional computing system 1245 may provide a number of services such as acting as a network proxy, managing incoming and/or outgoing data transmissions, etc. Additionally, an optional system manager computing system 1240 is also illustrated. The optional system manager computing system 1240 may assist in managing the execution of programs on other computing systems located within the data center 1200 (or optionally on computing systems located in one or more other data centers 1260). The optional system manager computing system 1240 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 1200 is connected to a number of other systems via a network 1270 (e.g., the Internet), including additional computing systems 1280 that may be operated by the operator of the data center 1200 or third parties such as clients, additional data centers 1260 that also may be operated by the operator of the data center 1200 or third parties, and an optional system manager 1250. In a manner similar to system manager 1240, the system manager 1250 may manage the execution of programs on computing systems located in one or more data centers 1200 and/or 1260, in addition to providing a variety of other services. Although the example system manager 1250 is depicted as external to any particular data center, in other embodiments it may be located within a data center, such as one of the data centers 1260.

Figure 13:
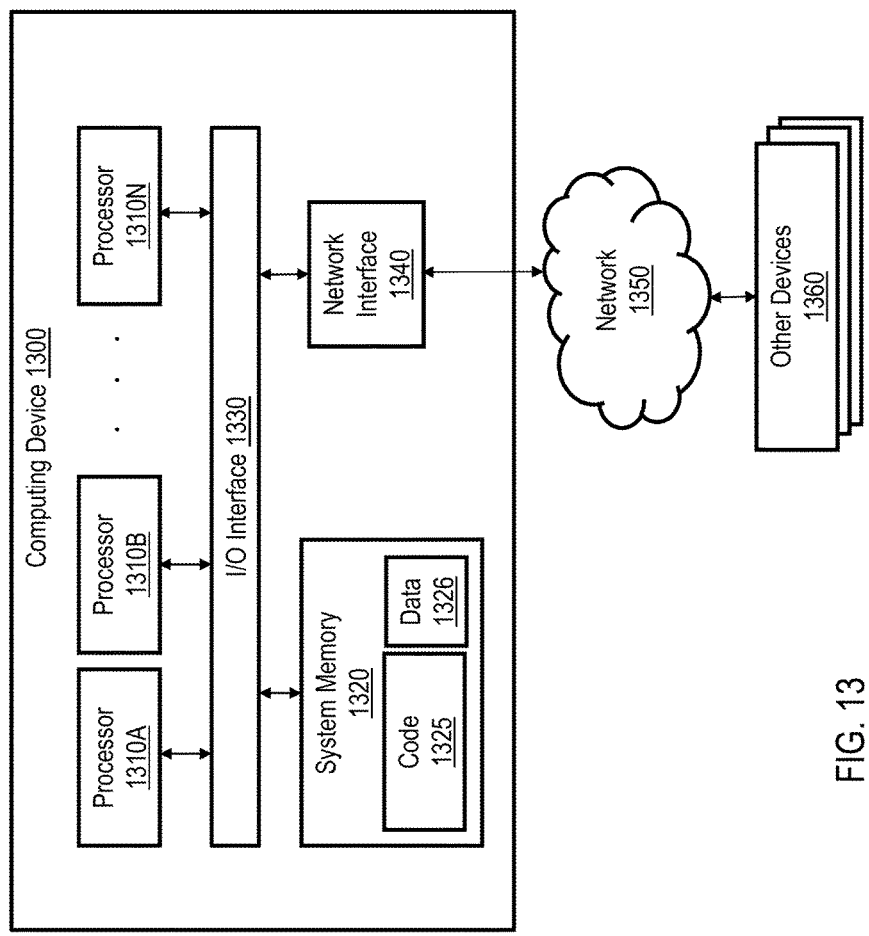
FIG. 13 shows a block diagram illustrating an example computing device, in accordance with various embodiments.

In at least some embodiments, a server that implements a portion or all of one or more of the technologies described herein, including the techniques to implement the control plane, data plane, and/or resources, may include a general-purpose computer system that includes or is configured to access one or more computer-accessible media. FIG. 13 shows such a general-purpose computing device 1300. In the illustrated embodiment, computing device 1300 includes one or more processors 1310 coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors. In some embodiments, web services layer 112, manager 110 and/or resources 126 are implemented by processors 1310.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code 1325 and data 1326

In one embodiment, I/O interface 1330 may be configured to coordinate I/O traffic between processor 1310, system memory 1320, and any peripheral devices in the device, including network interface 1340 or other peripheral interfaces such as various types of persistent and/or volatile storage devices used to store physical replicas of data object partitions. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of granting access to resources in a distributed computing environment comprising:
    receiving, by a programming interface of a control interface, which includes a computer processor, of the distributed computing environment, a block of a distributed block chain database stored on at least two computing systems, the block including a ledger comprising a plurality of transactional data records;
    determining, by a service layer of the control interface, that one record of the plurality of records is a first request received from a client device for access to a first resource of a data interface of the distributed computing environment;
    authenticating, by a manager of the control interface, the first request;
    allocating, by the manager of the control interface, the first resource to the client device; and
    submitting, by the programming interface, a responsorial record to the block chain database, the responsorial record including an identifier that identifies an action taken in response to receiving the first request,
    wherein the distributed computing environment comprises a computing system separate from the at least two computing systems.

2. The method of claim 1, further comprising, decrypting, by the service layer, the one record, wherein the one record is an encrypted representation of the first request.

3. The method of claim 1, further comprising, receiving, by the programming interface, a list of a plurality of commands that can be invoked or a list of a plurality of resources that may only be accessed after receiving a request for access to one of the plurality of resources in a record stored in one of a plurality of blocks of the distributed block chain database.

4. The method of claim 3, further comprising:
    receiving, by the programming interface, a second request for access to a second resource directly from the client, the second resource being listed in the list of plurality of resources; and
    denying, by the manager, access to the second resource.

5. The method of claim 1 further comprising storing the distributed block chain database on the computing system of the distributed computing environment.

6. A system for providing a service in a distributed computing environment comprising:
    one or more computer processors; and
    memory including instructions, that upon being executed by the one or more computer processors, cause the one or more computer processors to:
        receive a ledger comprising a plurality of transactional data records stored in a block chain database stored on at least two computing systems;
        determine that one of the plurality of data records is an indication of a first request received from a client device for the service provided by the distributed computing environment;
        execute the first request; and
        submit a responsorial record to the block chain database, the responsorial record including an identifier that identifies an action taken in response to receiving the first request,
        wherein the distributed computing environment comprises a computing system separate from the at least two computing systems.

7. The system of claim 6, wherein the distributed computing environment is provided by a provider network.

8. The system of claim 6, wherein the instructions, upon being executed, further cause the one or more computer processors to decrypt the one record, the one record being an encrypted representation of the indication of the first request.

9. The system of claim 6, wherein the block chain database comprises a plurality of blocks, each of the plurality of blocks created by a hash value derived from all previous activity in the block chain database.

10. The system of claim 9, wherein the block chain database is stored in a plurality of third party computing devices, the plurality of third party computing devices being controlled by parties other than the client device or other than a party controlling the distributed computing environment.

11. The system of claim 6, wherein the instructions, upon being executed, further cause the one or more computer processors to authenticate the first request by authenticating a digital signature attached to the first request.

12. The system of claim 6, wherein the instructions, upon being executed, further cause the one or more computer processors to receive from the client device a list of a plurality of services that may only be provided after the one or more computer processors receive a request for one of the plurality of services in a record stored in the block chain database.

13. The system of claim 12, wherein the instructions, upon being executed, further cause the one or more computer processors to:
    receive, directly from the client device, a second request to provide a second service, the second service being listed in the list of plurality of services; and
    denying the second request.

14. The system of claim 6, wherein the one record is a digest of the first request.

15. The system of claim 14, wherein the first request is received directly from the client device and is executed in response to receiving the one record.

16. The system of claim 6, wherein the instructions, upon being executed, further cause the one or more computer processors to verify that the ledger is included in a verified block in the block chain database prior to executing the first request.

17. The system of claim 6 wherein the computing system of the distributed computing environment stores the block chain database.

18. A system comprising:
- a programming interface of a control interface of a distributed computing environment, the programming interface comprising one or more computer processors configured to receive a block of a block chain database stored on at least two computing systems, the block including a ledger comprising a plurality of transactional data records;
- a service layer of the control interface, the service layer comprising the one or more computer processors configured to analyze the plurality of records to determine that one of the plurality of records is an indication of a first request received from a client device for a first service provided by a data interface of the distributed computing environment; and
- a manager of the control interface, the manager comprising the one or more computer processors configured to execute the first request in response to receiving the indication of the first request,
- wherein the programming interface is further configured to submit a responsorial record to the block chain database, the responsorial record including an identifier of an action taken in response to the first request, and
- wherein the distributed computing environment comprises a computing system separate from the at least two computing systems.

19. The system of claim 18, wherein the programming interface is further configured to encrypt a responsorial record including an action taken in response to the first request and submit the encrypted responsorial record to the block chain database.

20. The system of claim 18, wherein the programming interface is further configured to decrypt the one record, the one record being an encrypted representation of the indication of the first request.

21. The system of claim 18, wherein:
- the programming interface is further configured to receive a list of services that may only be provided after receiving a request in a record in one of a plurality of blocks of the block chain database and receive a second request to perform a second service directly from the client device; and
- the manager is further configured to compare the second service to the list of services and, in response to the second service failing to be listed in the list of services, executing the second request.

22. The system of claim 21, wherein the manager is further configured to, in response to the second service being listed in the list of services, deny the second request.

23. The system of claim 18, wherein the first request is a request to store data in a storage instance of the distributed computing environment, a request to grant access to a compute instance of the distributed computing environment, or a request to receive data stored in the storage instance of the distributed computing environment.

24. The system of claim 18 wherein the computing system of the distributed computing environment stores the block chain database.

* * * * *